(12) United States Patent
Balasubramanian et al.

(10) Patent No.: US 12,548,062 B2
(45) Date of Patent: Feb. 10, 2026

(54) TRAINED MACHINE LEARNING MODELS FOR PREDICTING REPLACEMENT ITEMS USING EXPIRATION DATES

(71) Applicant: Maplebear Inc., San Francisco, CA (US)

(72) Inventors: Ramasubramanian Balasubramanian, San Francisco, CA (US); Sharath Rao Karikurve, Berkeley, CA (US)

(73) Assignee: Maplebear Inc., San Francisco, CA (US)

( * ) Notice: Subject to any disclaimer, the term of this patent is extended or adjusted under 35 U.S.C. 154(b) by 232 days.

(21) Appl. No.: 18/113,965

(22) Filed: Feb. 24, 2023

(65) Prior Publication Data

US 2024/0289855 A1    Aug. 29, 2024

(51) Int. Cl.
 *G06N 3/08* (2023.01)
 *G06Q 30/0601* (2023.01)

(52) U.S. Cl.
 CPC ......... *G06Q 30/06312* (2025.08); *G06N 3/08* (2013.01); *G06Q 30/0613* (2013.01); *G06Q 30/0631* (2013.01); *G06Q 30/06313* (2025.08)

(58) Field of Classification Search
 None
 See application file for complete search history.

(56) References Cited

U.S. PATENT DOCUMENTS

| | | | | |
|---|---|---|---|---|
| 6,965,871 B1* | 11/2005 | Szabo | ................ | G06Q 30/0603 705/26.8 |
| 10,459,954 B1* | 10/2019 | Walters | ................ | G06V 10/768 |
| 11,222,374 B1* | 1/2022 | Bell | ................ | G06Q 30/0635 |
| 11,803,891 B2* | 10/2023 | Pawar | ................ | G06Q 30/0637 |
| 12,008,622 B2* | 6/2024 | Cho | ................ | G06Q 30/0641 |
| 2014/0156423 A1* | 6/2014 | Argue | ................ | G06Q 20/203 705/16 |
| 2014/0188865 A1* | 7/2014 | Karatzoglou | ...... | G06Q 30/0282 707/732 |
| 2015/0149321 A1* | 5/2015 | Salameh | ............ | G06Q 30/0613 705/26.41 |

(Continued)

OTHER PUBLICATIONS

Zhang, L., "Diversity Balancing for Two-Stage Collaborative Filtering in Recommender Systems," Applied Sciences 10.4: 1257. MDPI AG. (Year: 2020).*

*Primary Examiner* — Nicholas D Rosen
(74) *Attorney, Agent, or Firm* — Fenwick & West LLP

(57) ABSTRACT

A specific item is identified to suggest a replacement therefor to a user. A set of candidate replacement items for the specific item is determined. For at least one of the candidate replacement items, an expiration score is determined based on expiration information associated with the item. A replacement score for the candidate replacement item is determined by inputting the determined expiration score as a feature into a machine learning model that is trained using features of historical samples of candidate replacement items suggested as a replacement to users and the replacement suggestion being accepted by the users. One or more of the candidate replacement items is selected based on respective replacement scores as one or more suggested replacement items. A graphical user interface of a client device of the user is caused to display the one or more suggested replacement items as the replacement for the specific item.

20 Claims, 6 Drawing Sheets

(56) References Cited

U.S. PATENT DOCUMENTS

| | | | |
|---|---|---|---|
| 2017/0109007 A1* | 4/2017 | Hurter | G08G 5/22 |
| 2017/0193592 A1* | 7/2017 | Avidan | G06Q 10/087 |
| 2021/0073671 A1* | 3/2021 | Puri | G06N 5/04 |
| 2021/0233143 A1* | 7/2021 | Cho | G06Q 30/0201 |
| 2022/0114640 A1* | 4/2022 | Pawar | G06Q 30/0631 |
| 2022/0230217 A1* | 7/2022 | Wallace | G06Q 10/0834 |
| 2025/0061505 A1* | 2/2025 | Rao Karikurve | G06Q 30/0635 |

\* cited by examiner

TRAINED MACHINE LEARNING MODELS FOR PREDICTING REPLACEMENT ITEMS USING EXPIRATION DATES

BACKGROUND

In current online concierge systems, pickers (e.g., shoppers) fulfill orders at a physical warehouse, such as a retailer, on behalf of customers as part of an online shopping concierge service. The pickers of the online shopping concierge service may be sent to various warehouses with instructions to fulfill orders for items, and the pickers then locate the items included in the customer's order in the warehouse. Item inventory at a warehouse may fluctuate throughout a day or week, so a picker may be unable to find an item ordered by a customer at the warehouse. In such situations, an online shopping concierge service may prompt a customer to identify a replacement item for the original item. For example, the online shopping concierge system may identify multiple replacement items for the unavailable item and prompt the customer to select one of the suggested items as a replacement. The customer may accept one of the suggested items as a replacement and receive delivery of the order along with the replacement item.

However, if the replacement item suggested by the online shopping concierge system and accepted by the customer as the replacement is not suitable as a replacement for the originally requested item in the current context and for the current customer, the customer may be dissatisfied with the shopping experience and may be discouraged from accepting replacements suggested by the online concierge system in the future. In addition to the negative customer experience (that may lead to increased requests for refunds and a reduced future order rate), poorly matched replacement suggestions also lead to wasteful consumption of computing resources of the online concierge system and network bandwidth. Identifying replacements may be difficult because a "good" replacement for a particular item may be different for different customers and also different for different contexts for the same customer. Including additional datapoints in an analysis for identifying replacements may account for these differences.

SUMMARY

This disclosure relates generally to computing systems that facilitate ordering an item through an online concierge system, and more specifically, to the online concierge system identifying suggested replacement items for a specific item that may be out of stock or otherwise unavailable to order. The specific item may be part of an order submitted by a customer to the online concierge system. In one example user experience, when a picker is fulfilling the order for the customer at a retail location, the picker may determine that the specified item is out of stock, thereby triggering a replacement suggestion flow. When a desired item is out of stock, the system may automatically generate suggestions of replacement items that the customer may choose to receive in place of the out-of-stock item (e.g., when a selected type and/or brand of bread is not available, the system suggests replacing the selected bread with another type and/or brand of bread). As another example, the system may predict that an item is out of stock (e.g., using a trained model) when the user is browsing for items before placing an order (e.g., specified by adding the item to the shopping list, by selecting the item and viewing item details, etc.). If a specific item is predicted to be out of stock, the online concierge system may also perform similar operations to automatically generate suggestions of one or more replacement items that the customer may choose to receive instead of the specific item (and which may be available and in-stock) and present the suggestions to the customer for consideration.

One problem with current replacement suggestions generated by the system is that the system looks at how "good" a replacement the candidate replacement item is for the original item (e.g., measured as the probability that the current customer in the current context will accept the replacement). However, previous systems did not consider the expiration date of the suggested item. As a result, the customer might receive an otherwise good replacement that might be expiring the next day. This may lead to a bad customer experience, which might prompt the customer to ask for a refund instead of accepting replacement suggestions during future out-of-stock situations (as well as for the current replacement item), thus hurting all sides of the marketplace.

To overcome the above problem, when identifying the suggested replacement items, one or more embodiments of the system consider expiration dates of candidate replacement items. In one or more embodiments, the expiration dates of the candidate replacement items are normalized by the customer's frequency of purchasing items of this type, which provides a normalized expiration factor for that customer for a given candidate replacement item. The system may thus personalize the effect that expiration dates have on the suggested replacement items. In some embodiments, the expiration date for a candidate replacement item may be obtained from the retailer (e.g., based on inventory information), or it may be derived based on one or more data sources which may include retailer data. In some embodiments, the system may also prompt the customer to provide a preference for the expiration date for the item.

One or more embodiments disclosed herein may then use the normalized expiration factor when determining an approval score for each of the candidate replacement items. The approval score may be based on customer engagement that is related to the popularity of the particular candidate replacement item as being a suitable replacement item for the specified item and for a given context that has been accepted by other customers in the past without subsequent negative feedback. For example, the approval score may be based on the ratio between the number of times the particular candidate replacement item is accepted as the replacement and the number of times it was shown as a replacement to the customers.

One or more embodiments disclosed herein may also utilize the normalized expiration factor when determining a similarity score for each of the candidate replacement items. The similarity score may be determined by applying a machine learning model to features (e.g., product category, sub-category, store aisle, department, binary features like vegan, fat-free, kosher, etc.) of each of the candidate replacement items to determine the similarity of the candidate replacement item to the original product. The features may further include as input to the machine learning model, the normalized expiration factor when calculating the similarity score.

One or more embodiments may cause determination of an ensemble score for each candidate replacement item based on the approval and similarity scores for the item. Different weights may be applied to the approval score and the similarity score in determining the ensemble score. For example, for products with a lot of customer engagement signals, the approval score may have a high weighting factor and the similarity score may have a low weighting factor (e.g., weight of 1 or close to 1 for the approval score and weight of 0 or close to 0 for the similarity score). And for products that are relatively new or less popular (e.g., adequate customer engagement data not available, low popularity for the particular candidate replacement item as being a suitable replacement item for the specified item and for a given context based on past customer replacement choices, etc.), the similarity score may have a high weighting factor and the approval score may have a low weighting factor (e.g., weight of 1 or close to 1 for similarity score and weight of 0 or close to 0 for the approval score).

Based on the ensemble scores, one or more embodiments may cause identification of one or more of the candidate replacement items as suggested replacement items that may be presented to the customer for consideration. For example, a predetermined number (e.g., top 10) of the candidate replacement items having the highest ensemble scores, may be included in a ranked list of suggested replacement items and the list may be presented to the customer.

If the customer selects one of the suggested replacement items as the replacement, one or more embodiments may further cause transmission of information associated with the selected item (e.g., navigation map showing the picker the exact shelf where the selected replacement item is, augmented reality data to assist picker in finding the item, etc.) to the picker's client device for order fulfillment by the picker. Thus, according to the present disclosure, expiration-date-aware recommendations are surfaced to customers. This may lead to bigger shopping lists, customers finding items they need, retailers being able to sell their stock, brands being able to get into customers' baskets, and pickers getting potentially larger tips and having an easier time with replacements.

DETAILED DESCRIPTION

Figure 1:
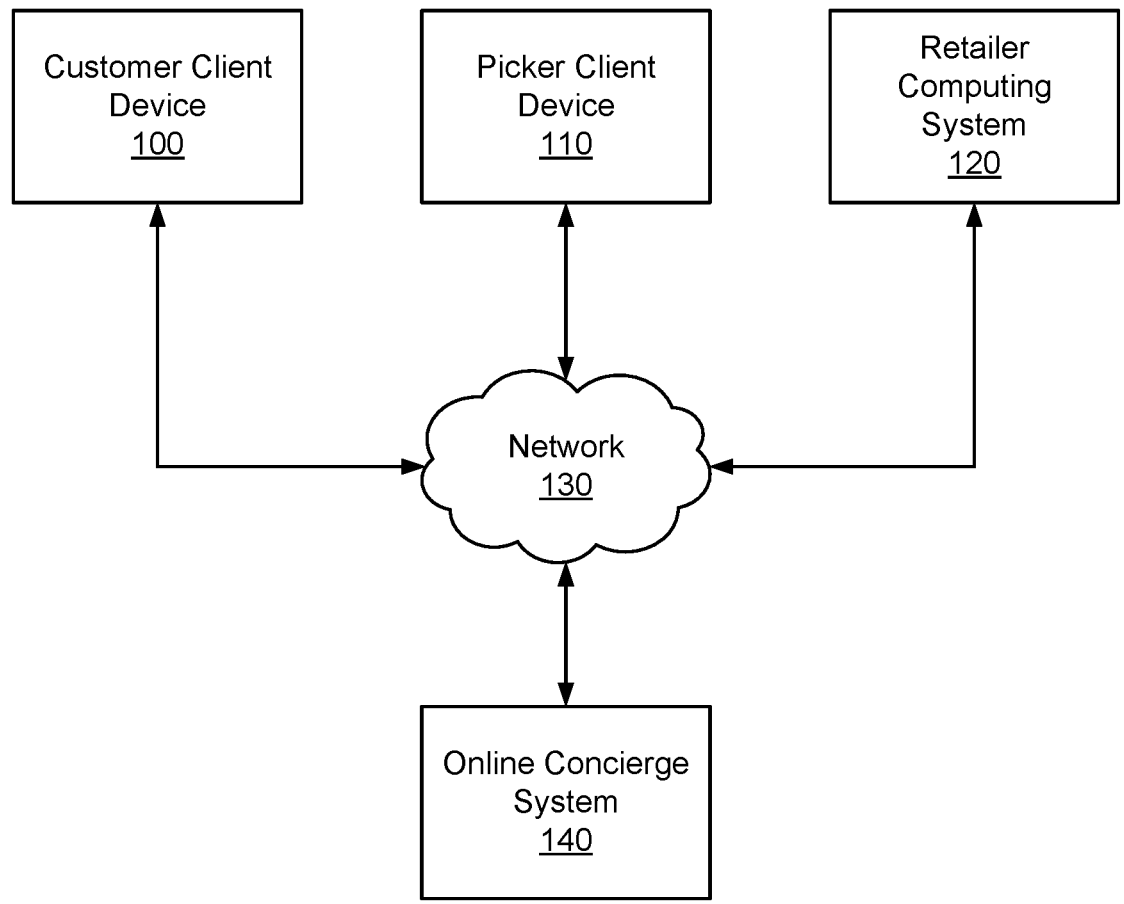
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order.

This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
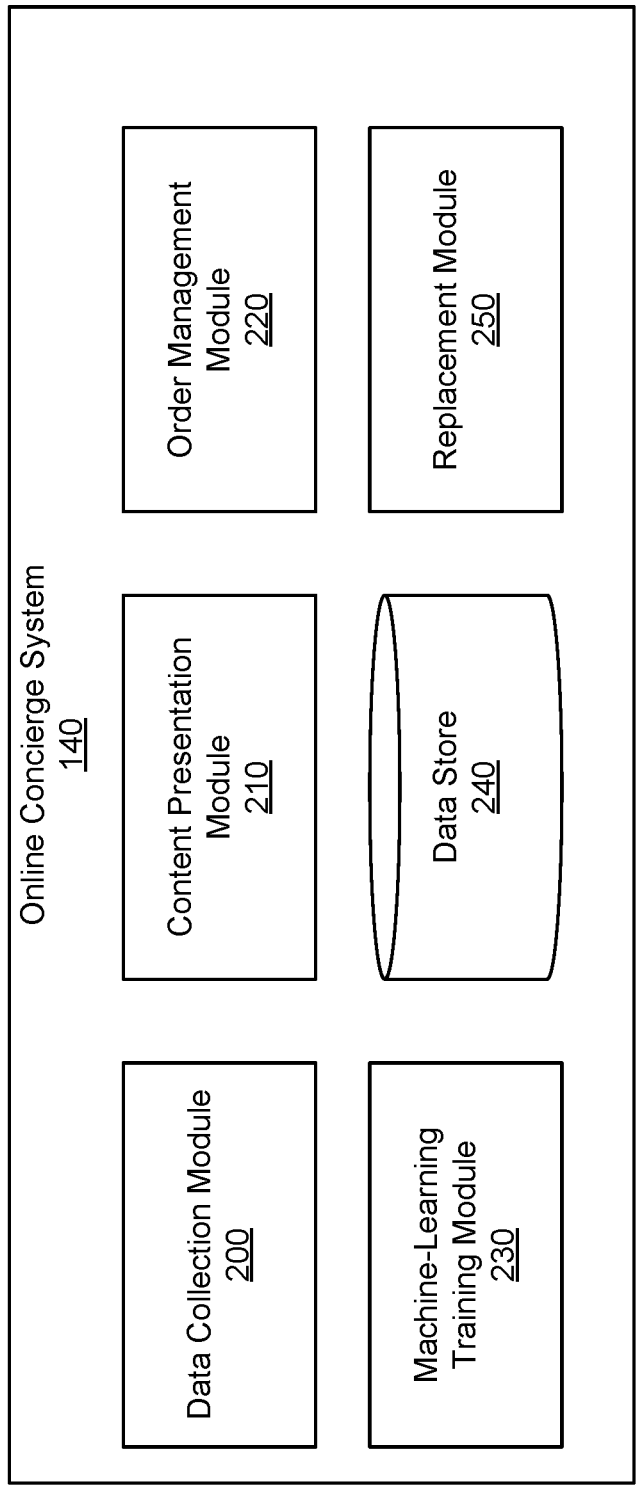
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, and a replacement module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140.

The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data and may use databases to organize the stored data.

The replacement module 250 is configured to identify a ranked list of suggested replacement items as suggested replacements for a specific item identified based on an input from the customer. In generating the ranked list of suggested items, the replacement module 250 may be configured to take into consideration the expiration date of the suggested replacement item based on, e.g., expiration data from the retailer. Further, the replacement module 250 may be configured to take into consideration the customer's preference for the expiration date of such items from the time when the item is received by the customer based on, e.g., the customer's past order frequency for such items or the customer's expiration preference provided by the customer. The ranked list of suggested items may thus surface "good" recommendations for the current customer and in the current context that are not only good replacements for the original specified item, but also have an expiration date that matches the customer's expectation. As a result, customer experience is improved and the probability of receiving subsequent negative feedback from the customer or a request for return/exchange/refund from the customer after the item is received, is reduced. Operation details and functionalities of the replacement module 250 are described below in connection with FIGS. 3-5.

Figure 3:
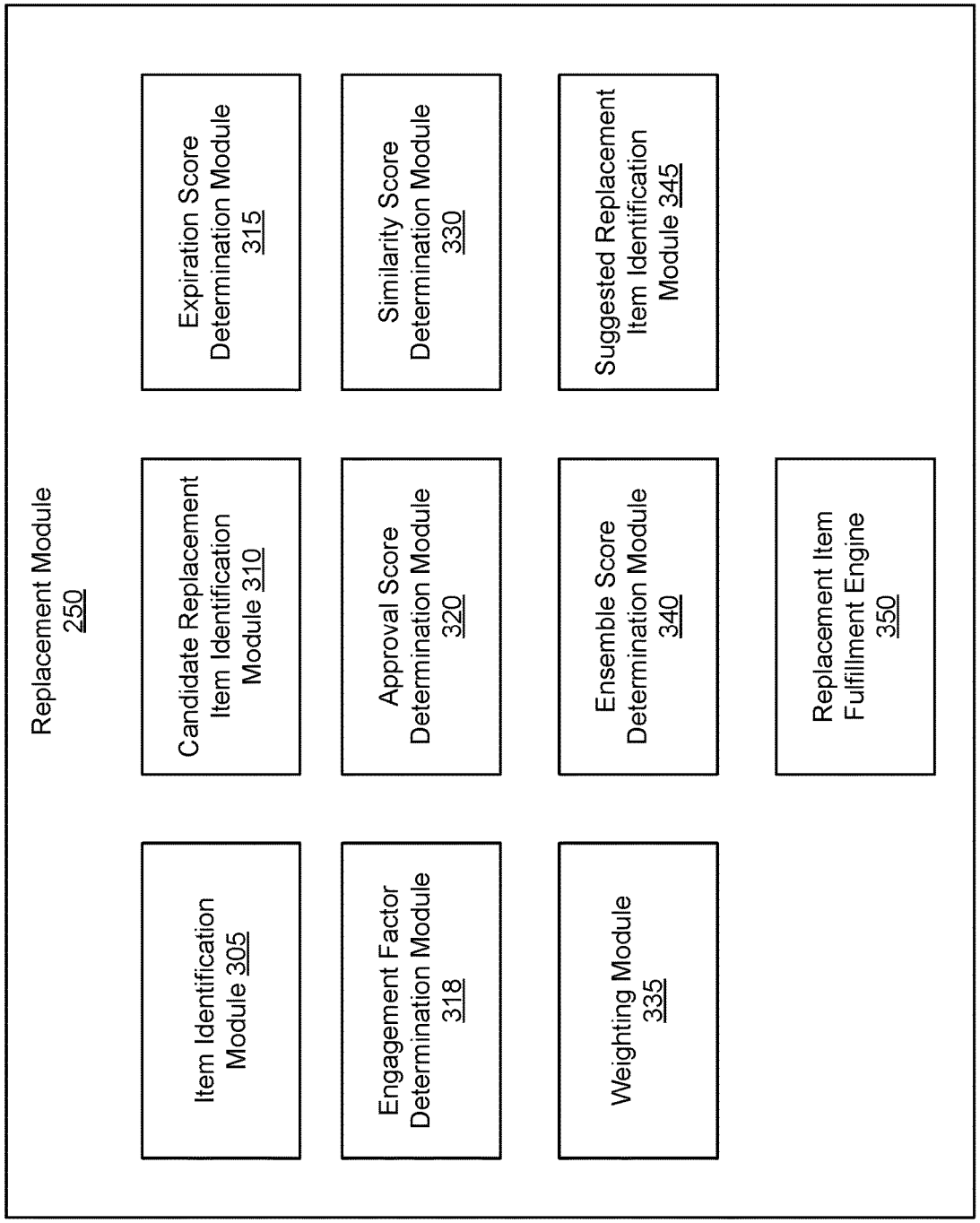
FIG. 3 illustrates an example block diagram for a replacement module of the online concierge system of FIG. 2, in accordance with some embodiments.

FIG. 3 illustrates an example block diagram for the replacement module 250 of the online concierge system 140 of FIG. 2, in accordance with some embodiments. The replacement module 250 illustrated in FIG. 3 includes an item identification module 305, a candidate replacement item identification module 310, an expiration score determination module 315, an engagement factor determination module 318, an approval score determination module 320, a similarity score determination module 330, a weighting module 335, an ensemble score determination module 340, a suggested replacement item identification module 345, and a replacement item fulfillment engine 350. Alternative embodiments may include more, fewer, or different components from those illustrated in FIG. 3, and the functionality of each component may be divided between the components differently from the description below. Additionally, each component may perform their respective functionalities in response to a request from a human, or automatically without human intervention.

The item identification module 305 may be configured to identify a specific item to suggest a replacement therefor to a user of the online concierge system 140. The specific item may be an item for which the replacement module 250 identifies one or more suggested replacement items and presents the suggested items as a ranked list to the customer. In one or more embodiments, the item identification module 305 may identify an item in an order that is determined to be out-of-stock as the specific item for replacement. For example, a customer may place an order that includes a plurality of items. The customer's order may be assigned to a picker, and when the picker is fulfilling the order at a retail location, the picker may determine one of the items in the order to be out-of-stock or otherwise unavailable. The picker may interact with the picker interface of the picker client device 110 to notify the item identification module 305 of the out-of-stock item. Based on the notification, the item identification module 305 may identify the out-of-stock item as the specific item for replacement. As another example, the item identification module 305 may predict a particular item in order to be low stock or likely out-of-stock and in that case, identify the particular item as the specific item for replacement. As yet another example, before placing an order (e.g., before checking out), the customer may specify one of the items listed on the ordering interface by adding the item to the shopping list or otherwise interacting with the ordering interface to select and view details of the item. Based on the customer operation on the ordering interface, the item identification module 305 may identify the item that was selected, viewed, or added to the shopping list by the customer as the specific item for replacement.

The candidate replacement item identification module 310 is configured to identify a plurality of (e.g., a set of) candidate replacement items as replacement candidates for the specific item identified by the item identification module 305. When identifying the candidate replacement items to a specific item, the candidate replacement item identification module 310 may account for the distance between the specific item and different candidate replacement items in an item graph. In some embodiments, the candidate replacement item identification module 310 may be configured to perform the candidate identification operation of identifying the plurality of candidate replacement items as replacement candidates for each item included in the item data collected by the data collection module 200 of the online concierge system 140.

For example, the candidate identification operation for each item in the item data may be performed periodically or based on other conditions like the addition of new items to the item data collected by the data collection module 200. The item data may include data corresponding to a large number of items (e.g., millions of products or items), and by performing the candidate identification operation, the candidate replacement item identification module 310 may identify for each item, a small subset of the items as candidate replacement items (e.g., hundreds of candidate replacement items for each item). The candidate replacement items may then be utilized by the replacement module 250 for further processing for suggesting replacement items (e.g., top 10 of the candidate replacement items based on a score) according to the present disclosure. The operation of identifying the plurality of candidate replacement items for a given item is described in more detail in U.S. Patent Application Publication No. 2022/0114640, filed Oct. 13, 2020 by Abhay Pawar and entitled "Identifying Candidate Replacement Items from a Graph Identifying Relationships between Items Maintained by an Online Concierge System," and in U.S. Patent Application Publication No. 2022/0292567, filed Mar. 9, 2021, by Shishir Prasad et al and entitled "Inferring Categories in a Product Taxonomy using a Replacement Model," both of which are herein incorporated by reference in their entirety.

The expiration score determination module 315 is configured to determine for at least one of the candidate replacement items identified by the candidate replacement item identification module 310, an expiration score based on expiration information associated with the candidate replacement item. The expiration score determined by the expiration score determination module 315 enables the system to utilize the expiration information of the candidate item when generating the ranked list of suggested items as a replacement for the original product. Further, in some embodiments, the expiration score determination module 315 may normalize the expiration score to compute a normalized expiration factor for the candidate replacement item based on order frequency information associated with the user corresponding to the item identified by the item identification module 305. This normalization may personalize the effect the expiration information has on the ranking for the suggested replacement items based on the past order history of individual users for such items or based on preference provided by the user. For example, a family of four might be able to consume a loaf of bread in four days, and so a replacement bread (e.g., of a different brand than the one specified by the customer) that expires in four days may be a suitable replacement option and should rank highly in the list of suggested replacement items. On the other hand, a single individual customer might take much longer than four days to consume the same loaf of bread, and so a replacement bread (e.g., of a different brand than the one specified by the customer) that expires in four days may not be a suitable replacement option and should rank lower in the list of suggested replacement items for this single individual customer. Further, personalizing the rankings based on product expiration information as explained in the above example is important from the perspective of the retailer who wishes to optimally allocate stock the retailer has and avoid excessive inventory of unsold expired or about to expire products. That is, the retailer would prefer to sell the bread that expires in four days to the customer who is a family of four (since they may be able to consume it in that much time) instead of bread that has expires in 10 days (since there are only so many loaves of bread that expires after 10 days). Operation details and functionalities of the expiration score determination module 315 are described below in connection with FIG. 4.

Figure 4:
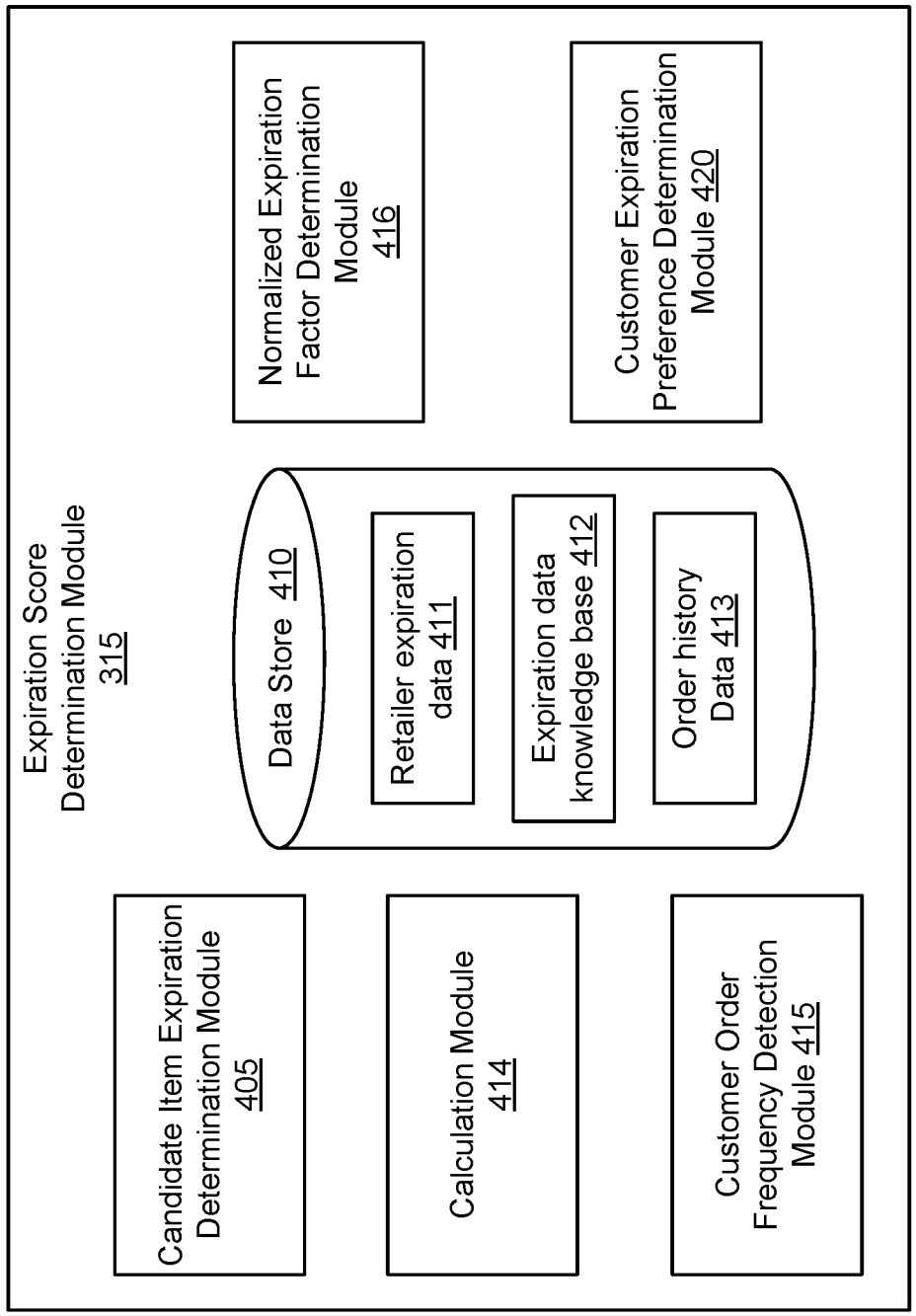
FIG. 4 illustrates an example block diagram for a normalized expiration factor determination module of the replacement module of FIG. 3, in accordance with some embodiments

FIG. 4 illustrates an example block diagram for the expiration score determination module 315 of the replacement module 250 of FIG. 3, in accordance with some embodiments. The expiration score determination module 315 illustrated in FIG. 4 includes a candidate item expiration determination module 405, a data store 410, a calculation module 414, a customer order frequency detection module 415, a normalized expiration factor determination module 416, and a customer expiration preference determination module 420. The data store 410 may include retailer expiration data 411, expiration data knowledge base 412, and order history data 413. Alternative embodiments may include more, fewer, or different components from those illustrated in FIG. 4, and the functionality of each component may be divided between the components differently from the description below. Additionally, each component may perform their respective functionalities in response to a request from a human, or automatically without human intervention.

The candidate item expiration determination module 405 determines for each candidate replacement item identified by the candidate replacement item identification module 310, the expiration information (e.g., time to expiry, expiration date, etc.) associated with the item. For example, the expiration information is a specific date on which the corresponding candidate item expires (e.g., "use by" date, "sell by" date, etc.). As another example, the expiration information is a date range associated with expiry of the corresponding candidate item. The candidate item expiration determination module 405 may determine the expiration information for the candidate item based on the retailer expiration data 411 stored in the data store 410.

The retailer expiration data 411 may be in the form of one or more databases of expiration dates of different items maintained by one or more retailers. The data 411 may be received, in whole or in part, from one or more retailers (e.g., from one or more retailer computing systems 120), and may include retailer data such as inventory data, stock data, restocking data, catalog data, and the like, that captures metrics like item counts, availability, expiry date, price, and the like. For example, the data 411 may include inventory data that includes for a given item (which may be a batch including many instances of the given item), the expiration date for the batch. As another example, the data 411 may include retailer restocking frequency data and the expiration information for an item may be determined by the candidate item expiration determination module 405 based on the restocking frequency for the item of the retailer and information regarding when the item was last stocked or restocked.

For items (e.g., produce items like fruits and vegetables) whose expiration information is not directly included in the retailer expiration data 411, the candidate item expiration determination module 405 may utilize the expiration data knowledge base 412 to determine the expiration information for the item. The expiration data knowledge base 412 may include information regarding a predicted shelf life for different types of produce items (e.g., based on publicly available facts/knowledge, retailer's past experience/data regarding number of days after which a produce item expires after the item is stocked on the shelf, etc.). For example, for a batch of produce items, the inventory data included in the retailer expiration data 411 may capture information such as the date when the produce item batch was stocked. Further, based on the information regarding a predicted shelf life included in the expiration data knowledge base 412 for the produce item, the candidate item expiration determination module 405 may determine (derive or calculate) the expiration information for the item.

The calculation module 414 may determine the expiration score of the candidate replacement item based on the expiration information for the item determined by the candidate item expiration determination module 405. For example, the expiration score may be a function of the expiration date (e.g., time remaining to expiry) of the candidate item, such that the longer the time remaining to expiry, the higher the expiration score, and vice versa.

The customer order frequency detection module 415 may detect the order frequency for the customer associated with the item identified by the item identification module 305. The order frequency (e.g., once every 2 weeks) may indicate the frequency with which the customer has historically placed orders with the online concierge system 140. As another example, the order frequency may indicate the frequency with which the customer has historically placed orders that include an item type (e.g., any brand/type of bread) that is associated with the specific item (e.g., a particular brand/type of bread). In order to detect the order frequency, the customer order frequency detection module 415 may utilize the order history data 413 corresponding to past orders of the customer stored in the data store 410.

Based on the expiration score determined by the candidate item expiration determination module 405 (or based on the expiration score determined by the calculation module 414), and the order frequency detected by the customer order frequency detection module 415, the normalized expiration factor determination module 416 may determine the normalized expiration factor for the candidate item. For example, the normalized expiration factor determination module 416 may normalize the expiration score to determine the normalized expiration factor for the candidate item by dividing the time to expiry for the candidate item (e.g., expires in 7 days) by the time between orders for the customer (e.g., every two weeks). The normalized expiration factor determination module 416 may further dictate a minimum threshold for the normalized expiration factor. For example, the minimum threshold may dictate that the time to expiry should be at least half the time between orders. That is, for example, if the customer places an order every two weeks, the minimum threshold may be determined to be satisfied if the expiration date for a particular candidate item is at least one week out from the delivery date.

The customer expiration preference determination module 420 may determine the customer's expiration preference for the item identified by the item identification module 305. That is, instead of inferring expiry date preferences and personalizing the effect the inference has on the rankings as described above (via the normalized expiration factor), customer expiration preference determination module 420 may interact with the customer to obtain their preferred expiry information (e.g., date or date range) for an item. For example, the customer expiration preference determination module 420 may interact with the customer via the ordering interface of the customer client device 100 to determine the customer's preference (e.g., the customer specifying that milk should expire at least two weeks out despite the customer's order frequency for milk being one week) regarding the expiry date for the specific item for which replacements are to be suggested by the replacement model 250. The normalized expiration factor may be determined based on the customer's specified expiration preference for the item instead of what can be inferred from their buying history, so that the ranked list of suggested items is based on the customer's specified expiration preference. For example, the normalized expiration factor determination module 416 may determine the normalized expiration factor for the candidate item by dividing the time to expiry for the candidate item (e.g., expires in 7 days) by the customer's expiration preference (e.g., expire in two weeks) for an item of this type. As a result, items that satisfy the customers preference will rank higher on the suggested item list than items that fall short of the expiry preference of the customer.

Returning to FIG. 3, the engagement factor determination module 318 determines for each original-candidate item pair, a customer engagement factor indicating a popularity of the candidate replacement item as being an acceptable replacement for the original item. For example, in a given context, the customer engagement factor may be determined based on a number of times the candidate replacement item has been recommended as one of the suggested replacement items by the replacement module 250 for the specific item identified by the item identification module 305, and the candidate replacement item recommended as one of the suggested replacement items is actually selected by users as the replacement item for the original item (and without subsequent negative feedback from the customer about the replacement item). For example, the customer engagement factor may be determined to be high if the number of times the candidate replacement item recommended as a suggested replacement item (by being included in a ranked list of suggested items and presented to the customer), and actually selected by customers as the replacement item (without subsequent negative feedback with respect to the replacement item), is higher than a threshold number (e.g., greater than 50 times).

The approval score determination module 320 may determine an approval score (e.g., replacement score) for each original-candidate item pair. In some embodiments, the approval score is determined based on heuristics as a ratio (e.g., heuristics score) between the number of times the candidate replacement item has been recommended as a suggested replacement item (e.g., in a ranked list of suggested items) by the replacement module 250 for the specific item identified by the item identification module 305, and the number of times the candidate replacement item (recommended as one of the suggested replacement items in the ranked list) is actually selected by customers as the replacement item for the original item.

In determining the heuristics score, the approval score determination module 320 may count as positive samples, each instance of the candidate replacement item (recommended as one of the suggested replacement items in the ranked list) being actually selected by customers as the replacement item for the original item, and without the customer subsequently providing negative feedback (e.g., any feedback or other action by customer indicating that the accepted replacement item was unsatisfactory as a replacement in the current context). For example, a positive sample would be a replacement for an out-of-stock item that a customer accepted in a given context and without subsequent negative feedback regarding the replacement. The feedback may be collected after the users receive the order and provide a signal (e.g., thumbs up/down) for each replacement.

Further, in determining the heuristics score, the approval score determination module 320 may count as negative samples, each instance of one or more candidate replacement items (that were recommended as one of the suggested replacement items in the ranked list) but were not selected by the customers as the replacement item for the original item. The approval score determination module 320 may also count as negative samples, each instance of the candidate replacement item (recommended as one of the suggested replacement items in the ranked list) being actually selected by customers as the replacement item for the original item, but where the customer subsequently provided negative feedback (e.g., a thumbs down signal for the replacement item after delivery). Thus, for example, for the negative samples, the approval score determination module 320 may take original-candidate replacement item pairs that the customer didn't select out of the replacement options shown for a given out-of-stock product in a given context as well as those replacements where the customers subsequently gave a negative feedback (e.g., thumbs down).

With respect to counting the negative samples, for example, where ten items were shown to the customer as suggested replacement items and the customer chose one of them, the other nine suggested replacement items need not necessarily represent "unacceptable" replacement options for the original item. To prune the noisy negative labels, the approval score determination module 320 may use one or more techniques. One exemplary technique could be to look at the heuristics score for the candidate item paired with other original items. For example, if the heuristics scores for the candidate item paired with one or more other original items is greater than a threshold (e.g., greater than 0.5) then the negative label for the candidate item as paired with the current original item (item specified by the module 305) may be removed when determining the heuristics score for the current original-replacement pair. Another exemplary technique could be to look at the number of times the candidate replacement item is actually selected by customers as the replacement item when paired with other original items (engagement score). If the number is higher than a threshold number (e.g., greater than 50 times), then the negative label for the candidate item as paired with the current original item (item specified by the module 305) may be removed when determining the heuristics score for the current original-replacement pair.

The above positive and negative labeling techniques utilized by the approval score determination module 320 when determining the heuristics score for each original-candidate item pair may also be utilized by the engagement factor determination module 318 when determining the customer engagement factor for each original-candidate item pair.

Further, to surface expiration-date-aware suggestions, the approval score determination module 320 may implement a machine learning model (e.g., a linear model) to determine a replacement score for the candidate replacement item. The model may be trained using features of historical samples (e.g., the above-described positive samples, or negative samples) and be able to accept as one of the input features, the expiration score determined by the expiration score determination module 315 and output the approval score (e.g., replacement score). In some embodiments, the machine learning model may determine the approval score (e.g., replacement score) for each original-candidate item pair based on the corresponding heuristics score and further based on the normalized expiration factor for the candidate replacement item determined by the expiration score determination module 315. For example, the linear model may determine the approval score based on the following equation:

Approval Score Heuristics Score+Normalization Factor*Normalized Expiration Factor The linear model may be trained to obtain appropriate values for the Normalization Factor, which could be a global constant or could depend on the user, context, product, and the like. In some embodiments, for products (e.g., candidate replacement items) whose customer engagement factor determined by the engagement factor determination module 318 is high (e.g., higher than the threshold), the replacement module 250 may be configured to exclusively utilize (or give a relatively high weight to) the approval score generated by the approval score determination module 320 when performing the expiration-date-aware determination regarding whether a candidate item should be recommended as a suggested replacement item in a ranked list of the suggested items presented to the customer.

The similarity score determination module 330 may identify a similarity score (e.g., replacement score) for the candidate replacement item. In some embodiments, the similarity score determination module 330 may be implemented as a machine learning model. The model may be trained using features of the historical samples (e.g., the above-described positive samples, or negative samples), and be able to accept as one of the input features, the expiration score determined by the expiration score determination module 315 and output the similarity score (e.g., replacement score). For example, the machine learning model may be a product similarity model that generates product embeddings for product or item features of the candidate item and generates latent space vectors based on product embeddings to find the similarity between two products (e.g., the original item (identified by the item identification module 305) and the candidate replacement item) as a similarity score. The product features may include any feature of the item and may be based on the item data in the datastore 240 or the retailer expiration data 411 in the datastore 410. For example, the features for which the embeddings may be generated include brand, aisle, department name, item identifier, binary indicator features for various attributes (e.g., attributes defining whether the item is kosher, vegan, fat free, etc.), price, taxonomy information, product name, product description, product category, product sub-category, and the like. In some embodiments, the machine learning model may be implemented as a deep learning model (e.g., artificial neural network like a Siamese network). The deep learning model may be configured to, based on the generated product embeddings using the product features, obtain the difference in the product embeddings of two products and calculate the similarity score based on the obtained difference.

In some embodiments, to surface expiration-date-aware suggestions based on the similarity scores, one of the plurality of product features for which the product embeddings are generated and that is input into the model for obtaining the similarity score may be the normalized expiration factor for the candidate item that is determined by the expiration score determination module 315. That is, the amount of time left for the product to expire, normalized by the time between purchases, may be input as a feature in the machine learning model to calculate the similarity score. For example, the machine learning model may take in as an additional feature in the machine learning model, the normalized expiration factor obtained by the module 416 by dividing the time to expiry for the candidate item by the time between orders for the customer (or the expiration preference provided by the customer) and use the output similarity score to rank each retrieved candidate item.

In some embodiments, for products (e.g., candidate replacement items) whose customer engagement factor determined by the engagement factor determination module 318 is low (e.g., lower than the threshold), the replacement module 250 may be configured to exclusively utilize (or give a relatively high weight to) the similarity score generated by the similarity score determination module 330 when performing the expiration-date-aware determination regarding whether a candidate item should be recommended as a suggested replacement item in a ranked list of the suggested items presented to the customer. For example, for products that are relatively new (cold start) or less popular (long tail), adequate customer engagement signals indicating the suitability of a given candidate item as an acceptable replacement for a given original item in a given context may not be available. In such situations, utilizing a deep learning model like a Siamese network as explained above can enable the system to compare candidate items to the original item and rank the candidate items for presentation of the expiration-aware top ranked candidates as suggestions to the customer.

The weighting module 335 is configured to determine, for each candidate item, whether one or both of the approval score and the similarity score are to be determined respectively by the approval score determination module 320 and the similarity score determination module 330. The weighting module 335 may make this determination based on the user engagement factor determined for the candidate item by the engagement factor determination module 318. For example, if the user engagement factor for a particular candidate item is high (e.g., higher than a threshold; indicating that the candidate item is a popular choice as a replacement for a particular original item), the weighting module 335 may determine that only the approval score needs to be determined for the candidate item by the approval score determination module 320 and the similarity score need not be determined for the candidate item by the machine learning model 330. Alternatively, in this case, the weighting module 335 may determine that both the approval score and the similarity score are to be calculated but that the approval score will be assigned a higher weighting factor (e.g., between 0.5 and 1) and the similarity score will be assigned a lower weighting factor (e.g., between 0.5 and 0).

On the other hand, for example, if the user engagement factor for a particular candidate item is low (e.g., lower than a threshold; indicating that the candidate item is not a popular choice as a replacement for a particular original item; indicating that the candidate item is a new product or an uncommon product), the weighting module 335 may determine that only the similarity score needs to be determined for the candidate item by the similarity score determination module 330 and the approval score need not be determined by the approval score determination module 320. Alternatively, in this case, the weighting module 335 may determine that both the approval score and the similarity score are to be calculated but that the similarity score will be assigned a relatively higher weight (e.g., between 0.5 and 1) and the similarity score will be assigned a relatively lower weight (e.g., between 0.5 and 0). That is, the weighting module 335 may assign the weighting factors for the approval score and the similarity score based on the customer engagement factor such that the weighting factor for the approval score is directly correlated with the customer engagement factor, and the weighting factor for the similarity score is inversely correlated with the customer engagement factor.

The ensemble score determination module 340 may generate an ensemble score for the candidate replacement item based on the approval score and the similarity score. For example, the ensemble score determination module 340 may generate the ensemble score by applying the weighting factor for the approval score determined by the weighting module 335 to generate a weighted approval score and applying the weighting factor to the similarity score determined by the weighting module 335 to generate the weighted similarity score and generating the ensemble score based on the weighted approval score and the weighted similarity score. If the weight for the approval score is determined to be 0, the ensemble score may be the same as the similarity score. Conversely, if the weight for the similarity score is determined to be 0, the ensemble score may be the same as the approval score.

In some embodiments, the ensemble score calculation may be based on heuristics, as described above. In other embodiments, the ensemble score determination may be implemented as a machine learning model that is trained to output the ensemble score based on inputs for the approval score and the similarity score, and further based on input engagement signals corresponding to the customer engagement factor, for a given candidate item. The replacement module 250 may thus calculate ensemble scores for each of the plurality of candidate replacement items retrieved by the candidate replacement item identification module 310 as replacement candidates for the original item identified by the item identification module 305.

The suggested replacement item identification module 345 may identify one or more suggested replacement items based on the ensemble score of each of the plurality of candidate replacement items. In some embodiments, based on the ensemble scores, the suggested replacement item identification module 345 identifies a top n number of the candidate replacement items (e.g., candidate replacement items having the top 10 ensemble scores) as the suggested replacement items. The suggested replacement item identification module 345 may cause a graphical user interface (e.g., the ordering interface on the customer client device 100) to display the identified suggested replacement items. In some embodiments, the suggested replacement item identification module 345 may further cause the graphical user interface to display for each of the suggested replacement items, corresponding expiration information determined by the candidate item expiration determination module 405. In some embodiments, the suggested replacement item identification module 345 may further cause the graphical user interface to display a ranked list of the plurality of suggested replacement items ranked in the order of the items having the highest ensemble scores. The graphical user interface with the ranked list of suggested replacement items may be presented as a pop-up or other suitable interface element to the customer. The system may thus enable the customer to input a selection out of the expiration-aware suggested replacement items displayed on the graphical user interface while also being presented with the expiration information for each suggested replacement item. The customer may thus be able to decide and choose between, e.g., a less preferred brand or type of bread that ranks higher on the list of suggested replacement items and that expires in 7 days and a more preferred brand or type of bread that ranks lower on the list of suggested replacement items and that expires in 3 days.

The replacement item fulfillment engine 350 may be configured to receive a confirmation from the customer indicating that a particular one of the suggested replacement items identified by the suggested replacement item identification module 345 has been accepted by the customer as a replacement for the specific item identified by the item identification module 305. For example, in response to the graphical user interface displaying the ranked list of the plurality of suggested replacement items ranked in the order of the items having the highest ensemble scores to the customer, the customer may browse the ranked list of items and corresponding expiration information for each item and select a particular item in the ranked list and confirm the selected item as a replacement for the original specified item. And the replacement item fulfillment engine 350 may receive the confirmation from the customer indicating the replacement item.

Further, the replacement item fulfillment engine 350 may transmit information associated with the item selected by the customer as the replacement to a picker client device 110 of the picker fulfilling the customer's during the item collection operation. In the out-of-stock context, the ranked list may be generated by the replacement module 250 in response to the system receiving notification from the picker client device 110 that the specific item (which is a part of the customer's order being filled by the picker) is out-of-stock. And in response to the customer (in real-time or near real-time) inputting a selection for the replacement from the (expiration-date-aware) ranked list, the replacement item fulfillment engine 350 may transmit the information regarding the selected replacement back to the picker client device 110 so that the picker filling the customer's order can complete the item collection operation and deliver the order to the customer. In another context, the ranked list may be generated in response to the customer browsing the item selection on the online concierge system and adding items to the shopping list prior to checkout. For example, the customer may add an item to the shopping list and before the item is added to the shopping list, the suggested replacement item identification module 345 may present a pop-up on the ordering interface of the customer client device 100 with the (expiration-aware) ranked list of suggested replacement items that the user may choose instead of the item (which may be available and in-stock) being added to the shopping list by the customer. As another example, after the customer has added the item to the shopping list, and prior to checkout, the suggested replacement item identification module 345 may present a pop-up on the ordering interface of the customer client device 100 with the (expiration-aware) ranked list of suggested replacement items that the user may select from as an acceptable replacement item in case the ordered item (added to the shopping list) happens to be unavailable at the time the order is being filled by the picker.

The information associated with the item selected by the customer as the replacement that is transmitted by the replacement item fulfillment engine 350 to the picker client device 110 may include information the picker may utilize to locate the replacement item in the retailer location. For example, the information may include particulars of the replacement item like brand, aisle, department name, item identifier, expiration date, etc. As another example, the information may include navigation data for a store navigation map that is included in an application on the picker client device 110 and that the picker can utilize to navigate inside the retail location to the exact aisle and/or shelf where the replacement item is located inside the retailer location. As another example, the information may include augmented reality data for an augmented reality application that is on the picker client device 110 and that the picker can utilize to locate not only the replacement item inside the retailer location but also to locate the replacement item that has an expiration date that matches the expiration information associated with the replacement item selected by the customer.

Figure 5:
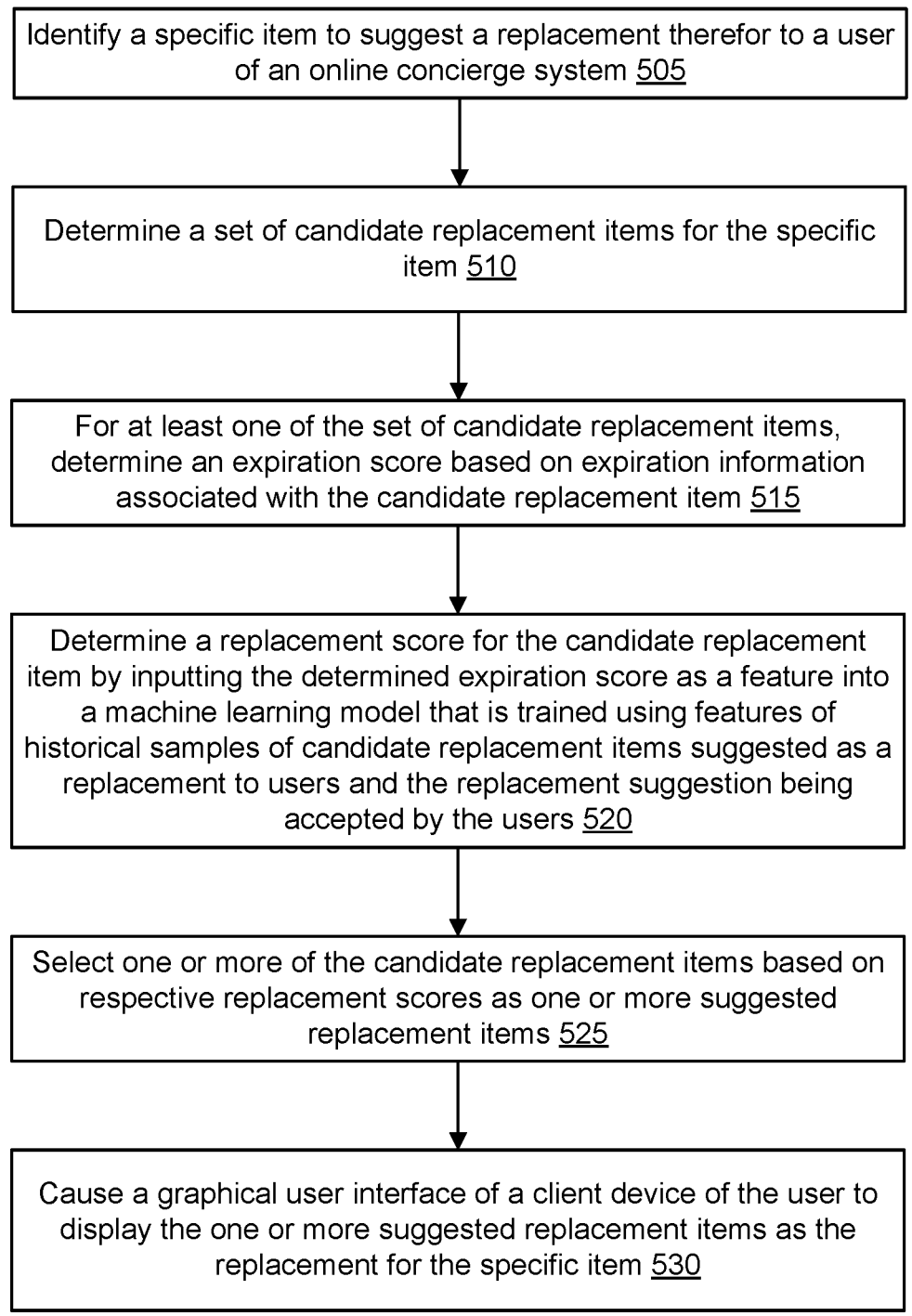
FIG. 5 is a flowchart for a method of identifying expiration-date-aware suggested replacement items for an identified item by a replacement module, in accordance with some embodiments.

FIG. 5 is a flowchart 500 for a method of identifying expiration-date-aware suggested replacement items for an identified item by a replacement module, in accordance with some embodiments. Alternative embodiments may include more, fewer, or different steps from those illustrated in FIG. 5, and the steps may be performed in a different order from that illustrated in FIG. 5. These steps may be performed by an online concierge system (e.g., online concierge system 140). More specifically, these steps may be performed by the replacement module 250 of the online concierge system 140. Additionally, each of these steps may be performed automatically by the online concierge system without human intervention.

The item identification module 305 of the replacement module 250 may identify 505 a specific item to suggest a replacement therefor to a user of an online concierge system. The candidate replacement item identification module 310 may determine 510 a set of candidate replacement items for the specific item. For at least one of the set of candidate replacement items, the expiration score determination module 315 may determine 515 an expiration score based on expiration information associated with the candidate replacement item.

The approval score determination module 320 and/or the similarity score determination module 330 may determine 520 a replacement score (e.g., approval score, similarity score, ensemble score) for the candidate replacement item by inputting the determined expiration score as a feature into a machine learning model that is trained using features of historical samples of candidate replacement items suggested as a replacement to users and the replacement suggestion being accepted by the users. The suggested replacement item identification module 345 may select 525 one or more of the candidate replacement items based on respective replacement scores as one or more suggested replacement items. The suggested replacement item identification module 345 may further cause 530 a graphical user interface of a client device of the user to display the one or more suggested replacement items as the replacement for the specific item. In some embodiments, when the determined replacement score is higher than a particular threshold, the candidate replacement item may automatically be selected as the replacement item without first suggesting it as a replacement for the user.

Figure 6:
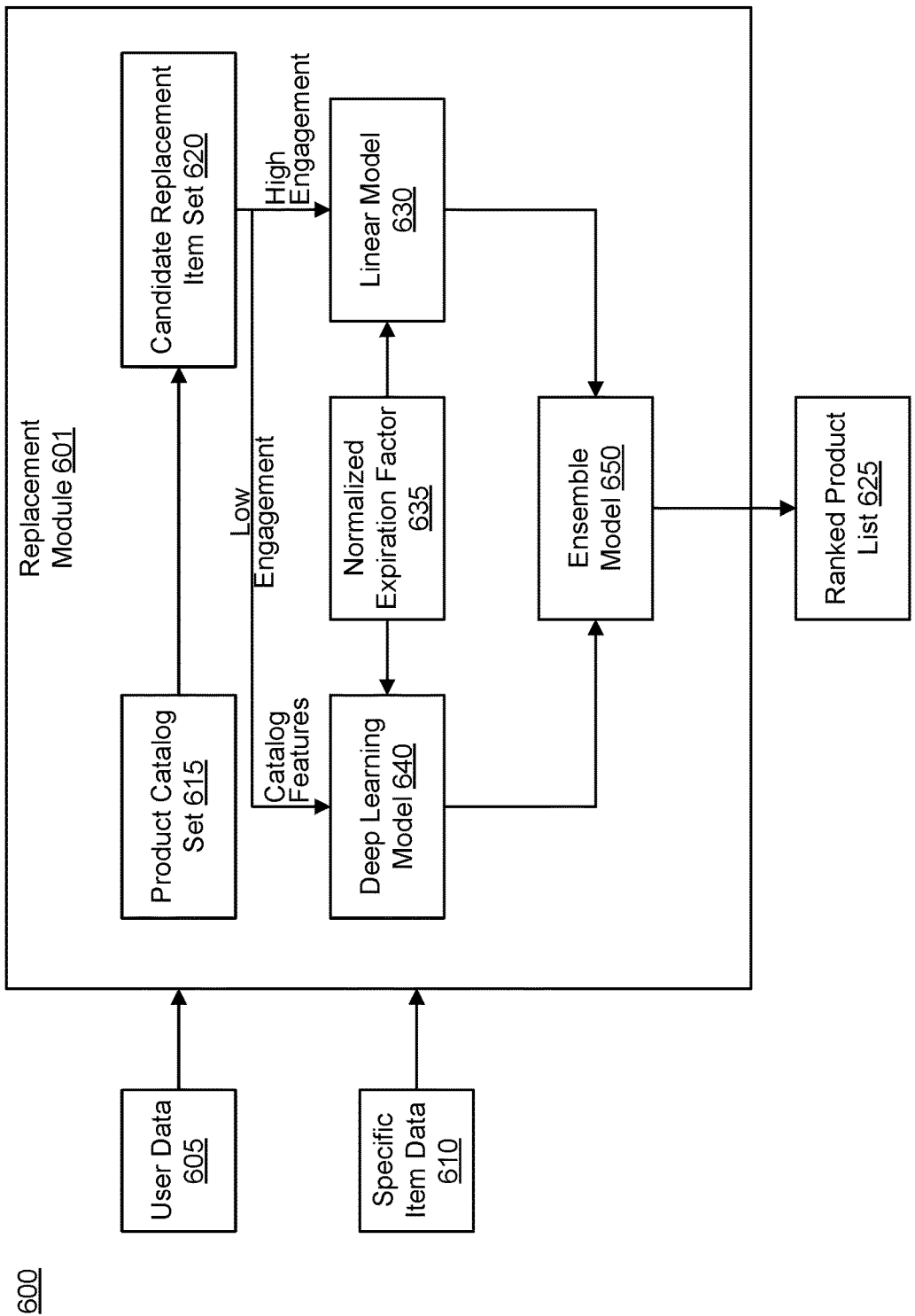
FIG. 6 is an information flow diagram showing the relationship between data and the machine learning models of the replacement module, in accordance with some embodiments.

FIG. 6 is an information flow diagram 600 showing the relationship between data and the machine learning models of the replacement module, in accordance with some embodiments. As shown in FIG. 6, the replacement module 601 may receive as input user data 605, and item data 610. The user data 605 may correspond to data associated with the user that has identified a specific item for which the replacement module 601 makes a replacement suggestion. The data 605 associated with the user may include order history data (e.g., order history data 413), context information, and the like. The specific item data 610 may include information identifying the specific item identified by the user and for which the replacement module 601 makes replacement suggestions (e.g., the item identified by the item identification module 305 of FIG. 3; out of stock item).

The replacement module 601 may include item data corresponding to a product catalog set 615 that represents all of the products listed on the online concierge system. The product catalog set 615 may identify and describe items that are available at a particular retailer location. The candidate replacement item set 620 may correspond to a set of candidate replacement items identified by performing the candidate identification operation (e.g., by the candidate replacement item identification module 310) for the specific item corresponding to the specific item data 610. For example, the product catalog set 615 may include data corresponding to a large number of items (e.g., millions of products or items), and by performing the candidate identification operation, the replacement module 601 may identify for the specific item 610, a small subset of the items as a set of candidate replacement items (e.g., hundreds of candidate replacement items).

The replacement module 601 may then perform processing using one or more machine learning models described above in connection with FIG. 3 to generate an expiration-date-aware ranked list of products 625 (e.g., suggested replacement items) based on corresponding scores (e.g., replacement score, similarity score, approval score, ensemble score). The ranked product list 625 may be displayed on the graphical user interface of the device of the user to enable the user to select one of the ranked suggested products as a replacement for the originally selected or ordered product.

As shown in FIG. 6, the scores based on which the ranked list of products 625 is generated may depend on user engagement data (e.g., user engagement factor calculated by engagement factor determination module 318 of FIG. 3). If the user engagement is high, the replacement module 601 may utilize the linear machine learning model 630 of the approval score determination module to calculate the approval score (e.g., replacement score) for each candidate replacement item in the candidate replacement item set 620. Further, as shown in FIG. 6, the normalized expiration factor (e.g., determined by the normalized expiration factor determination module 416) 635 may be input to the linear model 630 as one of the features. The linear model 630 may be trained using features of historical samples (e.g., the above-described positive samples, or negative samples) and be able to accept as one of the input features, the normalized expiration factor 635 and output the approval score (e.g., replacement score) in which the effect of the expiration date (e.g., time to expiry) of the candidate replacement item is personalized to the user.

If the user engagement is not high (e.g., for products that are relatively new or less popular), the replacement module 601 may utilize the deep learning model 640 of the similarity score determination module to calculate the similarity score (e.g., replacement score) for each candidate replacement item in the candidate replacement item set 620 based on product similarity between the specific item and the candidate replacement item. As shown in FIG. 6, the normalized expiration factor (e.g., determined by the normalized expiration factor determination module 416) 635 may be input to the deep learning model 640 as one of the features. The deep learning model 640 may be trained using features (independent of engagement signals) of historical samples (e.g., the above-described positive samples, or negative samples) and be able to accept as one of the input features, the normalized expiration factor 635 and output the similarity score (e.g., replacement score) in which the effect of the expiration date (e.g., time to expiry) of the candidate replacement item is personalized to the user.

The ensemble model 650 may be a machine learning model (or algorithm) that generates an ensemble score (e.g., replacement score) for the candidate replacement item based on the approval score from the linear model 630 and/or the similarity score from the linear model 630. Weights may be applied to the approval score and/or the similarity score by the ensemble model 650 as described above in connection with FIG. 3.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present), and B is false (or not present), A is false (or not present), and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present), and C is false (or not present). Similarly, as another not-limiting example, the condition "A, B, or C" is satisfied when A is true (or present), and B and C are false (or not present).

What is claimed is:

1. A method for suggesting personalized expiration date aware replacements, the method comprising, at a computer system comprising a processor and a computer-readable medium:

receiving, via a graphical user interface of an online concierge system displayed on a client device of a user, an order comprising a plurality of items;

identifying a specific one of the plurality of items to suggest a replacement for the specific item;

determining a set of candidate replacement items for the specific item;

for at least one of the set of candidate replacement items:
determining an expiration score based on expiration information associated with the candidate replacement item;
normalizing the expiration score to compute a normalized expiration factor for the candidate replacement item based on order frequency information associated with the user; and
determining a replacement score for the candidate replacement item by inputting the normalized expiration factor as a feature into a machine learning model that is trained using features of historical samples of candidate replacement items suggested as a replacement to users and the replacement suggestion being accepted by the users, wherein the replacement score for the candidate replacement item is decreased as a function of the normalized expiration factor, such that a smaller normalized expiration factor produces a smaller replacement score;

selecting one or more of the candidate replacement items based on respective highest replacement scores as one or more suggested replacement items;

receiving, from the user, a confirmation identifying a particular one of the suggested replacement items as a replacement for the specific item;

in response to the confirmation, transmitting to a picker client device: (i) store-navigation information and (ii) augmented-reality (AR) data configured to overlay guidance within a live camera view of the picker client device to: (a) navigate a picker to a physical location of the particular one of the suggested replacement items in a retailer location; and (b) locate and retrieve a corresponding instance of the particular one of the suggested replacement items that has an expiration date matching the expiration information associated with the user-selected replacement item;

receiving, from the picker client device, at least one of: (i) a scanned item identifier obtained by a barcode scanner, or (ii) image data of an item imaged by a camera, and, based on the scanned item identifier or the image data, verifying that the retrieved item corresponds to the user-selected replacement item; and updating an order-fulfillment status to indicate successful retrieval of the user-selected replacement item.

2. The method of claim 1, wherein the order frequency information indicates a frequency of the user ordering an item type associated with the specific item over time.

3. The method of claim 1, further comprising:
receiving the expiration information associated with the candidate replacement item from a retailer.

4. The method of claim 1, further comprising:
causing the graphical user interface of the online concierge system displayed on the client device of the user to display a ranked list of the one or more suggested replacement items and corresponding expiration information.

5. The method of claim 1, wherein the one or more suggested replacement items are a plurality of suggested replacement items that have the highest replacement scores.

6. The method of claim 1, further comprising:
determining, during an item collection operation by the picker servicing the user's order, that the specific item that is included in the order is not available;
wherein the specific item is identified based on the determination during the item collection operation.

7. The method of claim 1, wherein the specific item is identified based on an operation of the user on the graphical user interface of the client device to add the specific item to a shopping list.

8. The method of claim 1, wherein the expiration information associated with the candidate replacement item is determined based on information from a retailer and information in an expiration information knowledge base.

9. The method of claim 1, wherein the replacement score is an approval score that is based on a ratio between a number of times the candidate replacement item has been recommended as one of the one or more suggested replacement items for the specific item, and a number of times the candidate replacement item has been accepted by users as the replacement for the specific item based on the recommendation.

10. The method of claim 9, wherein the machine learning model is a first machine learning model, and wherein the method further comprises:
applying a second machine learning model to a plurality of features of the candidate replacement item to identify a similarity score for the candidate replacement item, one of the plurality of features being the normalized expiration factor.

11. The method of claim 10, further comprising:
determining a user engagement factor based on the number of times the candidate replacement item has been accepted by users being higher than a threshold number;
applying a first weighting factor to the approval score based on the user engagement factor to generate a weighted approval score;
applying a second weighting factor to the similarity score based on the user engagement factor to generate a weighted similarity score; and
generating an ensemble score based on the weighted approval score and the weighted similarity score,
wherein the one or more of the candidate replacement items are selected based on respective ensemble scores.

12. The method of claim 11, wherein the first weighting factor for the approval score is directly correlated with the user engagement factor, and the second weighting factor for the similarity score is inversely correlated with the user engagement factor.

13. The method of claim 1, further comprising:
normalizing the expiration score based on an expiration preference that is associated with the specific item and that is provided by the user.

14. The method of claim 1, further comprising:
automatically identifying one of the set of candidate replacement items as a replacement for the specific item based on a corresponding replacement score.

15. The method of claim 1, wherein the barcode scanner and the camera comprise a same mobile device.

16. A non-transitory computer-readable medium comprising instructions that, when executed by one or more processors, cause the one or more processors to:
receive, via a graphical user interface of an online concierge system displayed on a client device of a user, an order comprising a plurality of items;
identify a specific one of the plurality of items to suggest a replacement for the specific item;
determine a set of candidate replacement items for the specific item;
for at least one of the set of candidate replacement items:
determine an expiration score based on expiration information associated with the candidate replacement item;
normalize the expiration score to compute a normalized expiration factor for the candidate replacement item based on order frequency information associated with the user; and
determine a replacement score for the candidate replacement item by inputting the normalized expiration factor as a feature into a machine learning model that is trained using features of historical samples of candidate replacement items suggested as a replacement to users and the replacement suggestion being accepted by the users, wherein the replacement score for the candidate replacement item is decreased as a function of the normalized expiration factor, such that a smaller normalized expiration factor produces a smaller replacement score;

select one or more of the candidate replacement items based on respective highest replacement scores as one or more suggested replacement items;

receive, from the user, a confirmation identifying a particular one of the suggested replacement items as a replacement for the specific item;

in response to the confirmation, transmit to a picker client device: (i) store-navigation information and (ii) augmented-reality (AR) data configured to overlay guidance within a live camera view of the picker client device to: (a) navigate a picker to a physical location of the particular one of the suggested replacement items in a retailer location; and (b) locate and retrieve a corresponding instance of the particular one of the suggested replacement items that has an expiration date matching the expiration information associated with the user-selected replacement item;

receive, from the picker client device, at least one of: (i) a scanned item identifier obtained by a barcode scanner, or (ii) image data of an item imaged by a camera, and, based on the scanned item identifier or the image data, verifying that the retrieved item corresponds to the user-selected replacement item; and update an order-fulfillment status to indicate successful retrieval of the user-selected replacement item.

17. The non-transitory computer-readable medium of claim 16, wherein the order frequency information indicates a frequency of the user ordering an item type associated with the specific item over time.

18. The non-transitory computer-readable medium of claim 16, wherein the barcode scanner and the camera comprise a same mobile device.

19. An online concierge system comprising:
one or more processors; and
memory operatively coupled to the one or more processors and comprising instructions that, when executed by the one or more processors, cause the one or more processors to:
receive, via a graphical user interface of an online concierge system displayed on a client device of a user, an order comprising a plurality of items;
identify a specific one of the plurality of items to suggest a replacement for the specific item;
determine a set of candidate replacement items for the specific item;
for at least one of the set of candidate replacement items:
determine an expiration score based on expiration information associated with the candidate replacement item;
normalize the expiration score to compute a normalized expiration factor for the candidate replacement item based on order frequency information associated with the user; and
determine a replacement score for the candidate replacement item by inputting the normalized expiration factor as a feature into a machine learning model that is trained using features of historical samples of candidate replacement items suggested as a replacement to users and the replacement suggestion being accepted by the users, wherein the replacement score for the candidate replacement item is decreased as a function of the normalized expiration factor, such that a smaller normalized expiration factor produces a smaller replacement score;

select one or more of the candidate replacement items based on respective highest replacement scores as one or more suggested replacement items;

receive, from the user, a confirmation identifying a particular one of the suggested replacement items as a replacement for the specific item;

in response to the confirmation, transmit to a picker client device: (i) store-navigation information and (ii) augmented-reality (AR) data configured to overlay guidance within a live camera view of the picker client device to: (a) navigate a picker to a physical location of the particular one of the suggested replacement items in a retailer location; and (b) locate and retrieve a corresponding instance of the particular one of the suggested replacement items that has an expiration date matching the expiration information associated with the user-selected replacement item;

receive, from the picker client device, at least one of: (i) a scanned item identifier obtained by a barcode scanner, or (ii) image data of an item imaged by a camera, and, based on the scanned item identifier or the image data, verifying that the retrieved item corresponds to the user-selected replacement item; and update an order-fulfillment status to indicate successful retrieval of the user-selected replacement item.

20. The online concierge system of claim 19, wherein the barcode scanner and the camera comprise a same mobile device.

* * * * *